(12) United States Patent
Omet

(10) Patent No.: US 6,796,501 B2
(45) Date of Patent: Sep. 28, 2004

(54) SMART CARD READER CIRCUIT AND METHOD OF MONITORING

(75) Inventor: Dominique Omet, Cugnaux (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 234 days.

(21) Appl. No.: 09/845,114

(22) Filed: Apr. 30, 2001

(65) Prior Publication Data
US 2002/0158126 A1 Oct. 31, 2002

(51) Int. Cl.[7] ................................................. G06K 7/08
(52) U.S. Cl. ...................................... 235/451; 235/435
(58) Field of Search ................................. 235/435, 441, 235/448, 449, 451, 454, 492; 455/501, 502

(56) References Cited

U.S. PATENT DOCUMENTS

| | | | |
|---|---|---|---|
| 4,785,166 A | * 11/1988 | Kushima | 235/441 |
| 5,070,234 A | 12/1991 | Ishii et al. | 235/441 |
| 5,149,945 A | 9/1992 | Johnson et al. | 235/380 |
| 5,204,663 A | 4/1993 | Lee | 340/825.34 |
| 5,787,101 A | 7/1998 | Kelly | 371/49.1 |
| 5,815,672 A | 9/1998 | Dall' Asta | 395/282 |
| 5,968,142 A | 10/1999 | Frederic | 710/18 |
| 6,138,029 A | * 10/2000 | Digabel | 455/502 |
| 6,497,370 B1 | * 12/2002 | Moreaux | 235/492 |

FOREIGN PATENT DOCUMENTS

JP     02001166848 A    *  6/2001

* cited by examiner

Primary Examiner—Michael G. Lee
Assistant Examiner—Jamara A. Franklin
(74) Attorney, Agent, or Firm—James J. Stipanuk; Robert F. Hightower

(57) ABSTRACT

A smart card reader (8) includes a detection circuit (26) that has a plurality of inputs (30, 38, 42) for monitoring a plurality of operating conditions of the smart card reader. A plurality of outputs (53–56) provide a plurality of sense signals (VCCOK, VCCOC, VBATOK, CRDINS). A multiplexer (60) has a plurality of sense inputs coupled to the plurality of outputs of the detection circuit. A selection input (67, 68) receives a selection signal (ADDR) for routing one of the plurality of sense signals to an output (32) as a status signal (STATUS).

14 Claims, 3 Drawing Sheets

SMART CARD READER CIRCUIT AND METHOD OF MONITORING

BACKGROUND OF THE INVENTION

The present invention relates in general to semiconductor devices and, more particularly, to integrated circuits for interfacing with smart cards.

Smart cards are small plastic devices which contain one or more embedded integrated circuits for storing a user's personal data and for executing software programs to run smart card applications. A smart card is programmed and the personal data is accessed with a smart card reader that has an aperture or slot into which the smart card is inserted. Terminals within the slot connect to terminals on the smart card to provide power and data connections for operating the smart card.

There currently are two standard types of smart cards: three volt smart cards that operate from a three volt power supply and five volt smart cards that operate from a five volt supply. Smart card readers detect which type of smart card has been inserted and provide the appropriate power supply voltage at the supply terminals. Portable smart card readers typically operate from a five volt battery, and include a direct current to direct current (DC—DC) converter which generates a three volt supply across the supply terminals when a three volt card is inserted and a five volt supply when a five volt card is inserted.

Because the aperture is accessible, smart card readers can be damaged if foreign objects or defective smart cards are inserted. For example, an inserted metal object can cause an overcurrent or other fault condition which damages the DC—DC converter or corrupts data stored on the smart card. However, existing smart card readers offer little or no protection against such fault conditions because they use integrated circuits housed in low lead count semiconductor packages and therefore do not have extra leads available for monitoring operating conditions. The low lead count packages are used because of their small size and low fabrication cost.

Hence, there is a need for an integrated circuit and method of monitoring a variety of operating conditions of a smart card reader which can be used with a low lead count semiconductor package in order to increase the robustness of the smart card reader while maintaining a small size and low manufacturing cost.

DETAILED DESCRIPTION OF THE DRAWINGS

In the figures, elements having the same reference numbers have similar functionality.

Figure 1:
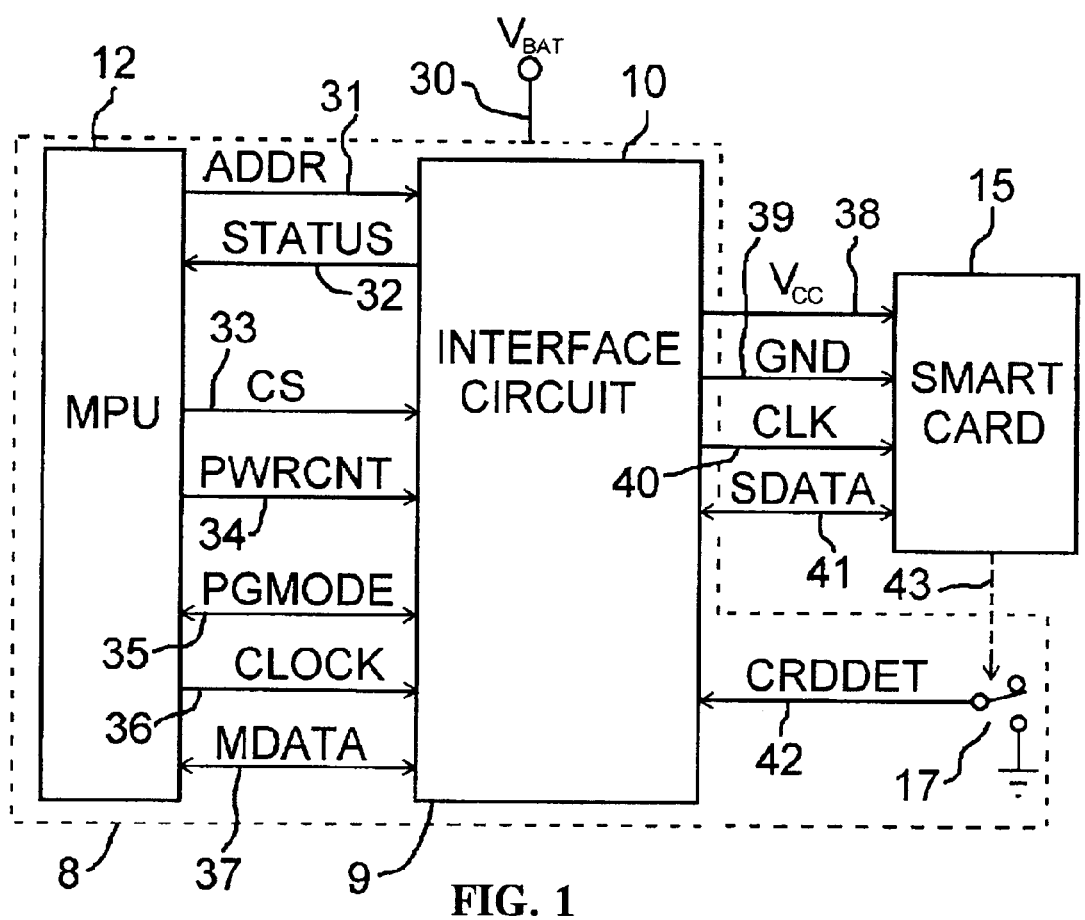
FIG. 1 shows a schematic diagram of a smart card and a card reader.

FIG. 1 is a schematic diagram of a smart card reader 8 for reading from and writing to a smart card 15. Card reader 8 includes a microprocessor (MPU) 12, a detection switch 17 and an interface circuit 10. Card reader 8 typically includes an aperture or slot (not shown) into which smart card 15 is inserted in order to commence communication. Card reader 8 connects to smart card 15 through terminals 38–43. A terminal 30 receives a battery supply voltage $V_{BAT}$ whose value ranges from about 2.7 to about 6.0 volts.

Smart card 15 includes one or more embedded integrated circuits that store and transfer information through interface circuit 10 to MPU 12. Smart card 15 may be either a three volt smart card specified to operate from $V_{CC}$=3.0 volts or a five volt smart card operating from $V_{CC}$=5.0 volts, in accordance with current global standards for smart cards.

MPU 12 is configured as an eight bit microcontroller that is programmed to execute software applications to control, process and update information stored on smart card 15. MPU 12 provides control and information processing to smart card 15 on a bus 31 and leads 32–37.

An enabling signal CS is provided on lead 33 with a logic high value to activate interface circuit 10. A mode control signal PGMODE is produced on lead 35 to control whether card reader 8 is functioning in an operating mode or a programming mode. When CS and PGMODE are logic high, card reader 8 is in the operating mode for accessing smart card data. When CS is high and PGMODE is low, the programming mode is initiated to allow MPU 12 to program the functionality of interface circuit 10. For example, in the programming mode, a power control signal PWRCNT provided on lead 34 is used to instruct interface circuit 10 to generate the correct value of $V_{CC}$ across terminals 38–39. A clock signal CLOCK is provided on lead 36 for synchronizing data transfers, executing software programs and other functions.

A bus 31 comprises two or more leads for sending binary selection data ADDR to interface circuit 10. In one embodiment, bus 31 includes two conductors providing two bits of parallel binary ADDR data, which therefore can have four different binary values. MPU 12 uses ADDR data to poll the status of a variety of operating conditions of card reader 8 in order to avoid data corruption or damage. Interface circuit 10 responds to the ADDR data by producing a status signal STATUS to indicate whether the corresponding operating condition has become a fault condition so that MPU 12 can take an appropriate corrective action such as disconnecting power or shutting down a circuit.

One operating condition monitored by MPU 12 is whether a smart card has been inserted, as indicated by the position of switch 17. Switch 17 is a normally open switch that is shown in the closed position to indicate the presence of smart card 15. Switch 17 is disposed in the aperture of smart card reader 8 and closed mechanically when smart card 15 is inserted, as represented by a control line 43. When no smart card is present, an internal pull-up resistor of interface circuit 10 sets the value of a detection signal CRDDET to be logic high. When smart card 15 is inserted, switch 17 closes as shown to ground lead 42 and set CRDDET to a low logic level. When selection signal ADDR cycles to a value that corresponds to the card insertion operating condition, interface circuit 10 sets STATUS to a logic high level to indicate the presence of a card. MPU 12 then initiates a handshaking routine that determines what type of card is present and produces an appropriate value of PWRCNT to interface circuit 10 in order to provide the correct value of $V_{CC}$ to smart card 15.

Interface circuit 10 includes analog and digital circuitry for performing specified interface functions between MPU 12 and smart card 15. For example, interface circuit 10 provides level shifting and synchronization of data transferred between MPU 12 and smart card 15. Smart card data SDATA is transferred through terminal 41 while microprocessor data MDATA is transferred through lead 37. Interface circuit 10 provides a clock signal CLK on lead 40 for operating smart card 15. In some applications, CLK operates at a lower clock frequency than CLOCK, so interface circuit 10 includes a clock divider that reduces the frequency of CLOCK to produce CLK.

Interface circuit 10 includes a direct current to direct current (DC—DC) converter that generates the smart card power supply across leads 38–39 as supply voltage $V_{CC}$ and ground potential GND, respectively. The DC—DC converter can be shut down by MPU 12 to disconnect power if a fault condition occurs. Interface circuit 10 is housed in a semiconductor package 9 that includes at least leads 31–42. Alternatively, interface circuit 10 and MPU 12 may be formed on the same semiconductor die and provided in a single package.

Figure 2:
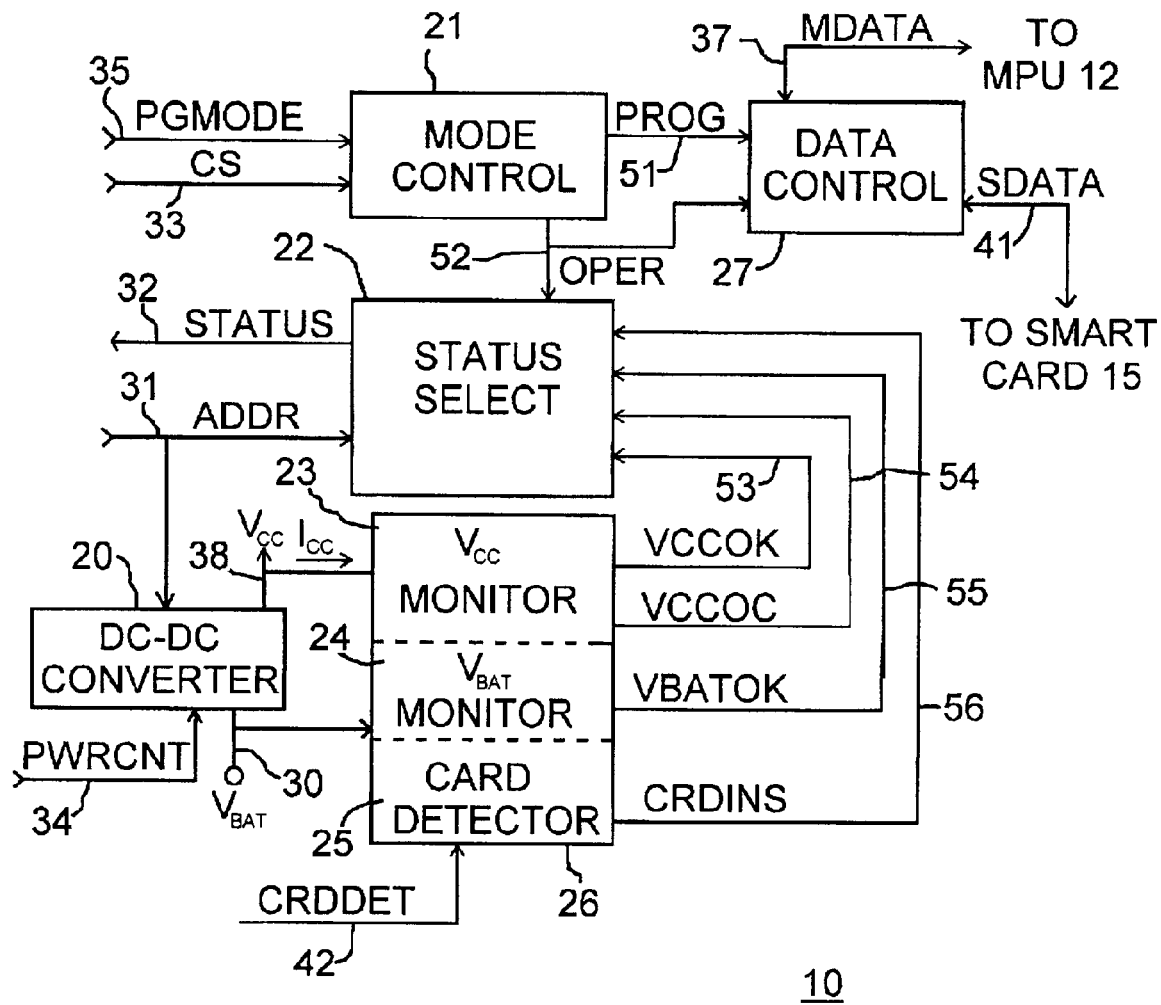
FIG. 2 shows a schematic diagram of an interface circuit of the smart card reader.

FIG. 2 is a schematic diagram of interface circuit 10 shown in further detail, including a DC—DC converter 20, a mode control circuit 21, a status select circuit 22, a monitoring circuit 26 and a data control circuit 27.

DC—DC converter 20 is a programmable converter that converts $V_{BAT}$ to the correct supply voltage $V_{CC}$. DC—DC converter 20 is activated when power control signal PWRCNT has a logic high value and shut down when PWRCNT has a logic low value. When smart card 15 is inserted, MPU 12 programs DC—DC converter 20 through selection signal ADDR to generate the correct value of $V_{CC}$ at terminal 38. DC—DC converter 20 occupies a relatively small die area of interface circuit 10 and therefore has a low fabrication cost. Using DC—DC converter 20 to generate either a three volt or a five volt $V_{CC}$ supply is more economical than using multiple batteries and an additional package lead to provide the appropriate $V_{CC}$ value to smart card 15.

Mode control circuit 21 is enabled when enabling signal CS is logic high to control whether card reader 8 is functioning in an operating mode or a programming mode. An input coupled to node 35 receives control signal PGMODE and an output 51 produces a programming signal PROG when PGMODE is logic low. PROG enables the programming function of data control circuit 27 to program interface circuit 10. When PGMODE is logic high, an output 52 provides an operating signal OPER to transfer SDATA from smart card 15 to MPU 12 as MDATA for reading smart card 15, or to transfer MDATA to smart card 15 as SDATA to modify information stored on smart card 15.

Monitoring circuit 26 monitors various operating conditions of card reader 8 in order to detect conditions that could result in component damage and/or data corruption. Monitoring circuit 26 includes a $V_{CC}$ monitor circuit 23, a $V_{BAT}$ monitor circuit 24 and a card detector circuit 26.

$V_{CC}$ monitor circuit 23 has an input coupled to node 38 for sensing the voltage and current levels of supply voltage $V_{CC}$. $V_{CC}$ monitor circuit 23 includes a bandgap reference or similar circuit that produces a first reference voltage that is compared to the amplitude of $V_{CC}$, and a sense signal VCCOK is generated at an output 53 when the magnitude of $V_{CC}$ is within a specified range. In one embodiment, sense signal VCCOK is set to logic high when $V_{CC}$ is operating within a range between about 4.5 and 5.5 volts. When a three volt card is inserted, VCCOK is logic high when $V_{CC}$ operates between 2.7 and 3.3 volts.

$V_{CC}$ monitor circuit 23 further includes a current sensor for detecting an overcurrent operating condition of a supply current $I_{CC}$ flowing at node 38. When $I_{CC}$ exceeds a predefined current level, such as when a damaged card is inserted, a sense signal VCCOC is generated with a logic low value at an output 54. When the magnitude of $I_{CC}$ is less than the predefined current level, VCCOC has a logic high value. In one embodiment, the predefined current level is selected to be one hundred milliamperes.

$V_{BAT}$ monitor circuit 25 has an input coupled to node 30 for sensing the magnitude of battery supply voltage $V_{BAT}$. $V_{BAT}$ monitor circuit 25 includes a bandgap reference or similar circuit that produces a second reference voltage that is compared to the amplitude of $V_{BAT}$ to generate a sense signal VBATOK at an output 55 when the magnitude of $V_{BAT}$ is within a specified range. In one embodiment, sense signal VBATOK is set to logic high when $V_{BAT}$ is operating at a voltage greater than about 2.2 volts to ensure the proper functioning of card reader 8. The first and second reference voltages may alternatively be generated by a circuit that is shared between $V_{CC}$ monitor circuit 23 and $V_{BAT}$ monitor circuit 24.

Card detector circuit 25 has an input coupled to node 42 for receiving detection signal CRDDET. An output 56 produces a sense signal CRDINS having a logic high value when smart card 15 is inserted and a logic low value when no card is present.

Status select circuit 22 has inputs coupled to outputs 53–56 of monitoring circuit 26 for receiving sense signals VCCOK, VCCOC, VBATOK and CRDINS, respectively. An input coupled to bus 31 receives selection signal ADDR to route a corresponding sense signal to lead 32 as status signal STATUS.

Figure 3:
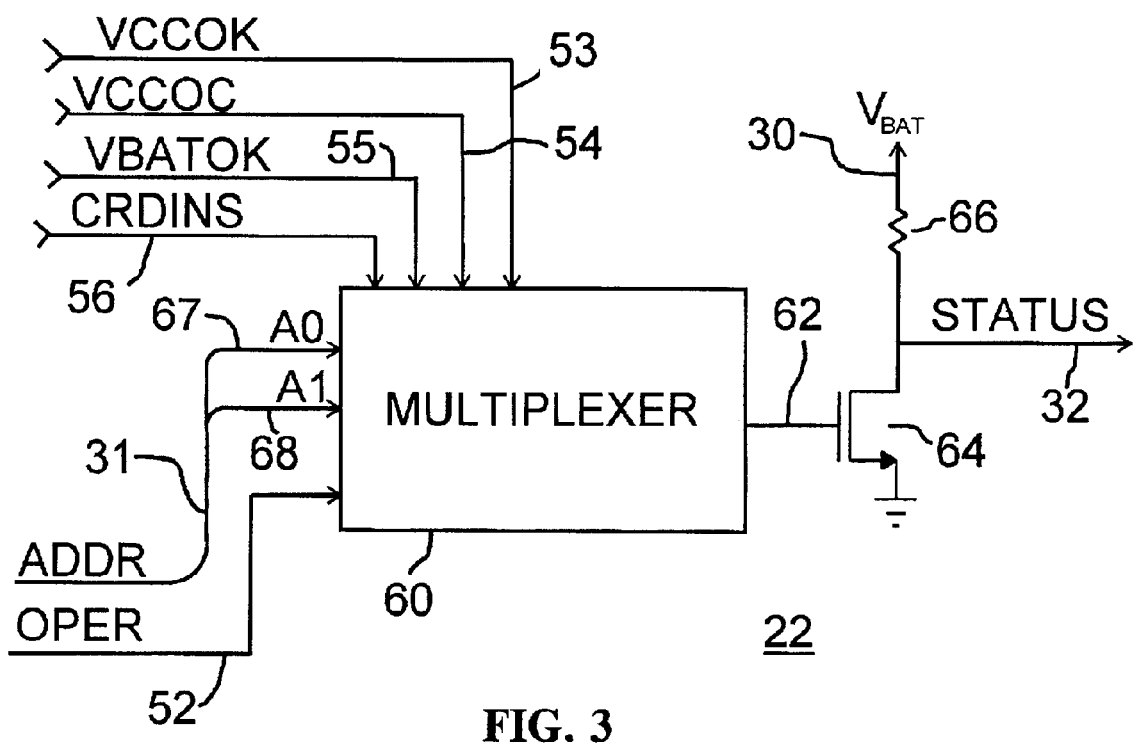
FIG. 3 shows a schematic diagram of a status selection circuit within the interface circuit.

FIG. 3 is a schematic diagram of status select circuit 22 in further detail, including a multiplexer 60, a transistor 64 and a resistor 66.

Transistor 64 and resistor 66 are coupled as shown to form an output buffer stage. Transistor 64 has a gate coupled for amplifying and inverting signals produced on an output 62 of multiplexer 60, and a drain that produces status signal STATUS on lead 32.

Multiplexer 60 comprises a digital one of four multiplexer having sense inputs coupled to nodes 53–56 for receiving sense signals VCCOK, VCCOC, VBATOK and CRDINS, respectively. Selection inputs 67 and 68 are coupled to conductors of bus 31 for receiving selection signals A0 and A1 of selection signal ADDR, respectively. Alternatively, bus 31 may comprise a single conductor that provides selection signals A0 and A1 serially, thereby reducing the number of leads of interface circuit 10 as well as the system size and cost.

The A0 and A1 logic values are decoded to select a corresponding sense signal for routing to lead 32 as status signal STATUS as follows. When A0 and A1 are both logic low, sense signal VCCOK is routed to output 62 and processed through transistor 64 to produce a value of STATUS that represents the value of VCCOK. Similarly, when A0 is logic high and A1 is logic low, sense signal VCCOC is routed to lead 32 as STATUS; when A0 is logic low and A1 is logic high, VBATOK is routed to lead 32 as STATUS; and when A0 and A1 are both logic high, CRDINS is routed to lead 32 as STATUS.

Hence, MPU 12 can receive information regarding the current status of a variety of operating conditions of card reader 8 on a single lead, i.e., lead 32. Hence, card reader 8 can be formed using low lead count integrated circuits to maintain a low fabrication cost while monitoring critical operating conditions in order to take corrective action when a fault condition is detected. The number of monitored operating conditions can be readily increased by increasing the number of selection bits while providing status information on a single integrated circuit package lead.

In summary, the present invention provides a smart card reader and method of monitoring the status of a plurality of operating conditions of the card reader. A detection circuit has a plurality of inputs for monitoring a plurality of operating conditions of the smart card reader. A plurality of outputs of the detection circuit provide a plurality of corresponding sense signals. A multiplexer has a plurality of sense inputs coupled to the plurality of outputs of the detection circuit. A selection input of the multiplexer receives a selection signal for routing one of the plurality of sense signals to an output as a status signal. Hence, operating conditions can be monitored at selected intervals and corrective action can be taken, such as stopping the communication between the microprocessor and the smart card or shutting the DC—DC converter in order to avoid data corruption or damage. As a result of such monitoring, the card reader is more robust than other card readers. The current status of the monitored operating conditions is provided on a single integrated circuit lead, which results in a small physical size and low manufacturing cost of the card reader.

What is claimed is:

1. A smart card reader, comprising:
   a detection circuit having a plurality of inputs for monitoring a plurality of operating conditions of the smart card reader, and a plurality of outputs for providing a plurality of sense signals wherein the detection circuit includes a first voltage monitor coupled to a first input of the plurality of inputs for monitoring a first voltage level of first node and providing a representative first sense signal of the plurality of sense signals at a first output of the plurality of outputs and wherein the detection circuit includes a second voltage monitor coupled to a second input of the plurality of inputs for monitoring a second voltage level at a second node and providing a second sense signal of the plurality of sense signals at a second output of the plurality of outputs; and
   a multiplexer having a plurality of sense inputs coupled to the plurality of outputs of the detection circuit, and an input for receiving a selection signal for routing one of the plurality of sense signals to an output as a status signal.

2. The smart card reader of claim 1, wherein the status signal is representative of the first voltage level when the selection signal has a first value and representative of the second voltage level when the selection signal has a second value.

3. The smart card reader of claim 1, wherein the detection circuit includes a current monitor coupled to the first input of the plurality of inputs for sensing a magnitude of a current flowing through the first node, and providing the second sense signal.

4. The smart card reader of claim 1, wherein one of the plurality of inputs of the detection circuit is coupled for detecting a smart card insertion, and one of the plurality of outputs provides one of the plurality of sense signals as a smart card insertion signal.

5. The smart card reader of claim 1, further comprising a semiconductor package for housing the detection circuit and the multiplexer.

6. An integrated circuit for controlling a smart card, comprising:
   a monitoring circuit having first and second inputs for monitoring first and second operating conditions of the integrated circuit for producing first and second sense signals at first and second outputs, respectively, wherein the first input of the monitoring circuit is coupled to a first node of the integrated circuit and the second input of the monitoring circuit is coupled for monitoring a second node, wherein the first output produces the first sense signal to represent a first voltage level of the first node, and wherein the second output produces the second sense signal to represent a second voltage level of the second node; and
   a multiplexer having first and second inputs respectively coupled to the first and second outputs of the monitoring circuit, and an input for receiving a selection signal for routing one of the first and second sense signals to an output as a status signal.

7. The integrated circuit of claim 6, wherein the first input of the monitoring circuit is coupled for sensing a current flowing through the first node, and a third output of the detection circuit provides a third sense signal representative of a level of the current.

8. The integrated circuit of claim 7, wherein the monitoring circuit has a third input coupled for detecting whether the smart card is present for providing a representative fourth sense signal at a fourth output.

9. The integrated circuit of claim 8, wherein the multiplexer has third and fourth inputs coupled to the third and fourth outputs of the monitoring circuit, and the status signal is representative of the first, second, third and fourth sense signals when the selection signal has first, second, third and fourth values, respectively.

10. A method of operating a card reader, comprising the steps of:
    monitoring first and second operating conditions of the card reader to produce first and second sense signals, respectively including sensing a first voltage at a first node to produce the first sense signal to represent a first voltage level of the first node and sensing a second voltage at a second node to produce the second sense signal to represent a second voltage level of the second node; and
    selecting between the first and second sense signals with a selection signal to produce a status signal.

11. The method of claim 10, wherein the step of monitoring includes the step of detecting a current flowing through the first node to produce the second sense signal to represent the level of current.

12. The method of claim 10, wherein the step of selecting includes the steps of:
    selecting the first operating condition with a first value of the selection signal to produce the first sense signal as the status signal; and
    selecting the second operating condition with a second value of the selection signal to produce the second sense signal as the status signal.

13. The method of claim 12, further comprising the steps of:
    monitoring a third operating condition of the card reader to produce a third sense signal; and
    selecting the third operating condition with a third value of the selection signal to produce the third sense signal as the status signal.

14. The method of claim 10, wherein the step of monitoring includes the step of detecting whether a card is present in the card reader to produce the first sense signal.

* * * * *